United States Patent
Zhang

(10) Patent No.: US 12,289,511 B2
(45) Date of Patent: *Apr. 29, 2025

(54) ELECTRONIC DEVICE, PHOTOGRAPHING METHOD, AND PHOTOGRAPHING APPARATUS WITH SLIDABLE ARC-SHAPED SURFACES

(71) Applicant: VIVO MOBILE COMMUNICATION CO., LTD., Dongguan (CN)

(72) Inventor: Qiaofeng Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,711

(22) Filed: Jan. 3, 2024

(65) Prior Publication Data

US 2024/0214659 A1  Jun. 27, 2024

Related U.S. Application Data

(63) Continuation of application No. 17/858,965, filed on Jul. 6, 2022, now Pat. No. 11,902,645, which is a
(Continued)

(30) Foreign Application Priority Data

Jan. 7, 2020 (CN) .......................... 202010012695.0

(51) Int. Cl.
*H04N 23/54* (2023.01)
*G03B 30/00* (2021.01)
*H04N 23/53* (2023.01)

(52) U.S. Cl.
CPC ............. *H04N 23/54* (2023.01); *H04N 23/53* (2023.01); *G03B 30/00* (2021.01); *H04M 2250/20* (2013.01)

(58) Field of Classification Search
CPC ........ H04N 23/54; H04N 23/53; H04N 23/57; H04N 23/695; H04N 23/698; H04N 23/80;
(Continued)

(56) References Cited

U.S. PATENT DOCUMENTS 10,808,879 B2    10/2020  Okumura
2005/0018074 A1   1/2005  Nakamoto et al.
(Continued)

FOREIGN PATENT DOCUMENTS

CN    101670584 A    3/2010
CN    101732870 A    6/2010
(Continued)

OTHER PUBLICATIONS

International Search Report issued in corresponding International Application No. PCT/CN2020/141892, mailed Mar. 25, 2021, 4 pages.
(Continued)

*Primary Examiner* — Padma Haliyur
(74) *Attorney, Agent, or Firm* — IPX PLLC

(57) ABSTRACT

An electronic device, a photographing method, and a photographing apparatus are provided. The electronic device includes a camera, a main body portion, a connecting rod, and a driving apparatus; a rear face of the camera is provided with a first arc-shaped surface that protrudes in a direction away from the camera, the main body portion is provided with a second arc-shaped surface that matches and is slidably connected to the first arc-shaped surface, and the second arc-shaped surface is provided with a through hole; the connecting rod penetrates through the through hole, and a first end of the connecting rod is hinged to the first arc-shaped surface of the camera; and the driving apparatus is connected to a second end of the connecting rod, and is
(Continued)

used to drive the connecting rod to drive the first arc-shaped surface to slide relative to the second arc-shaped surface.

7 Claims, 7 Drawing Sheets

Related U.S. Application Data continuation of application No. PCT/CN2020/141892, filed on Dec. 31, 2020.

(58) Field of Classification Search
CPC ... G03B 30/00; G03B 37/02; H04M 2250/20; H04M 1/0264; H04M 1/026
See application file for complete search history.

(56) References Cited

U.S. PATENT DOCUMENTS

| | | |
|---|---|---|
| 2008/0079847 A1 | 4/2008 | Kung et al. |
| 2009/0028542 A1 | 1/2009 | Nakamoto et al. |
| 2017/0353635 A1 | 12/2017 | Shin |
| 2019/0058828 A1 | 2/2019 | Russi-Vigoya et al. |
| 2019/0230260 A1 | 7/2019 | Zhang |
| 2020/0031398 A1* | 1/2020 | Maruoka ................. B60D 1/62 |
| 2020/0244877 A1 | 7/2020 | Zhou et al. |

FOREIGN PATENT DOCUMENTS

| | | |
|---|---|---|
| CN | 104994263 A | 10/2015 |
| CN | 205325736 U | 6/2016 |
| CN | 108387993 A | 8/2018 |
| CN | 209545633 U | 10/2019 |
| CN | 110995908 A | 4/2020 |
| WO | 2017183294 A1 | 10/2017 |

OTHER PUBLICATIONS

First Office Action issued in related Chinese Application No. 202010012695.0, mailed Aug. 25, 2020, 11 pages.
Second Office Action issued in related Chinese Application No. 202010012695.0, mailed Apr. 9, 2021, 12 pages.
Extended European Search Report issued in related European Application No. 20911679.7, mailed Jun. 7, 2023, 11 pages.

* cited by examiner

| | |
|---|---|
| Drive, in a case that the camera is started, the first arc-shaped surface to slide relative to the second arc-shaped surface, so as to drive the camera to rotate along a preset trajectory and capture images | 701 |
| Display a target image, where the target image is obtained by synthesizing images captured by the camera | 702 |

ELECTRONIC DEVICE, PHOTOGRAPHING METHOD, AND PHOTOGRAPHING APPARATUS WITH SLIDABLE ARC-SHAPED SURFACES

CROSS-REFERENCE TO RELATED APPLICATIONS

This application is a continuation of U.S. application Ser. No. 17/858,965, filed on Jul. 6, 2022, issued as U.S. Pat. No. 11,902,645, which is a continuation of International Application No. PCT/CN2020/141892, filed on Dec. 31, 2020, which claims priority to Chinese Patent Application No. 202010012695.0, filed on Jan. 7, 2020. The entire contents of each of the above-identified applications are expressly incorporated herein by reference.

TECHNICAL FIELD

The present disclosure relates to the field of communications technologies, and in particular, to an electronic device, a photographing method, and a photographing apparatus.

BACKGROUND

In the current market environment, photography, as an important selling point of mobile terminals, is increasingly favored by consumers and valued by mobile terminal manufacturers. In addition, the mainstream mobile terminal products have four or more cameras now, and a shooting field of view and a shooting angle of the mobile terminal are also important directions of concern.

In the related art, in order to increase the shooting field of view of the mobile terminal, a wide-angle camera is used as an auxiliary, and a software algorithm is also used to increase the shooting angle of the camera. However, the wide-angle camera is expensive, which increases the cost of the mobile terminal.

SUMMARY

Embodiments of the present disclosure provide an electronic device, a photographing method, and a photographing apparatus.

According to a first aspect, the embodiments of the present disclosure provide an electronic device, where the electronic device includes a camera, a main body portion, a connecting rod, and a driving apparatus;
  a rear face of the camera is provided with a first arc-shaped surface that protrudes in a direction away from the camera, the main body portion is provided with a second arc-shaped surface that matches and is slidably connected to the first arc-shaped surface, and the second arc-shaped surface is provided with a through hole;
  the connecting rod penetrates through the through hole, and a first end of the connecting rod is hinged to the first arc-shaped surface of the camera; and
  the driving apparatus is connected to a second end of the connecting rod, and is used to drive the connecting rod to drive the first arc-shaped surface to slide relative to the second arc-shaped surface, so as to drive the camera to rotate during a shooting process.

According to a second aspect, the embodiments of the present disclosure further provide a photographing method, applied to an electronic device, where the electronic device includes a main body portion and a camera, a rear face of the camera is provided with a first arc-shaped surface that protrudes in a direction away from the camera, the main body portion is provided with a second arc-shaped surface that matches and is slidably connected to the first arc-shaped surface, and the method includes:
  driving, in a case that the camera is started, the first arc-shaped surface to slide relative to the second arc-shaped surface, so as to drive the camera to rotate along a preset trajectory and capture images; and
  displaying a target image, where the target image is obtained by synthesizing images captured by the camera.

According to a third aspect, the embodiments of the present disclosure further provide a photographing apparatus, applied to an electronic device, where the electronic device includes a main body portion and a camera, a rear face of the camera is provided with a first arc-shaped surface that protrudes in a direction away from the camera, the main body portion is provided with a second arc-shaped surface that is slidably connected to the first arc-shaped surface, and the apparatus includes:
  a first driver module, configured to: drive, in a case that the camera is started, the first arc-shaped surface to slide relative to the second arc-shaped surface, so as to drive the camera to rotate along a preset trajectory and capture images; and
  a display module, configured to display a target image, where the target image is obtained by synthesizing images captured by the camera.

According to a fourth aspect, the embodiments of the present disclosure further provide an electronic device, including a memory, a processor, and a computer program stored in the memory and executable on the processor, where when the computer program is executed by the processor, the steps of the photographing method provided in the second aspect of the embodiments of the present disclosure are implemented.

According to a fifth aspect, the embodiments of the present disclosure further provide a computer readable storage medium. The computer readable storage medium stores a computer program, and when the computer program is executed by a processor, the steps of the photographing method provided in the second aspect of the embodiments of the present disclosure are implemented.

BRIEF DESCRIPTION OF DRAWINGS

To describe the embodiments of the present disclosure, the accompanying drawings required to describe the embodiments or the prior art are briefly described below. The accompanying drawings described below are only some embodiments of the present disclosure. It is apparent to those of ordinary skill in the art that other drawings may be further obtained based on the accompanying drawings without creative effort.

DETAILED DESCRIPTION

The following describes the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The electronic device provided in the embodiments of the present disclosure can drive the camera to rotate during the photographing process, so as to increase the shooting angle of the camera. In some embodiments, the foregoing electronic device may be a mobile phone, a tablet personal computer, a laptop computer, a Personal Digital Assistant (PDA), a Mobile Internet Device (MID), a wearable device, a computer, a notebook computer, or other electronic device with a camera.

Figure 1:
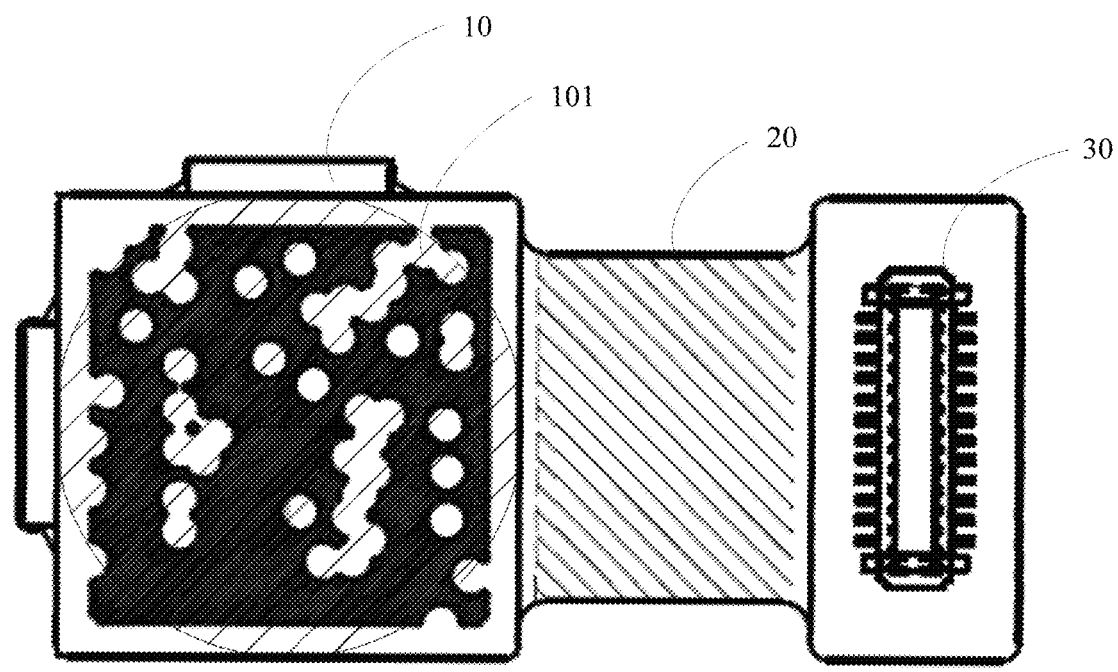
FIG. 1 is a schematic diagram of a connection between a first arc-shaped surface and a camera in an electronic device according to an embodiment of the present disclosure.
Figure 2:
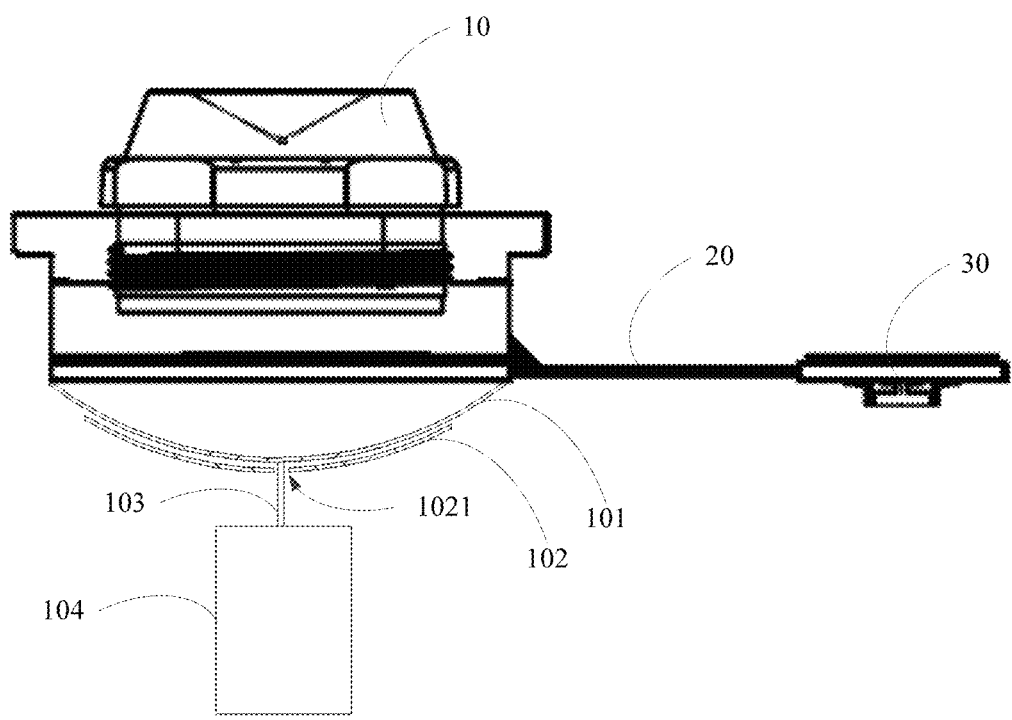
FIG. 2 is a block diagram of an electronic device according to an embodiment of the present disclosure.

Referring to FIG. 1 and FIG. 2, where FIG. 1 is a schematic diagram of a first arc-shaped surface and a camera in an electronic device according to an embodiment of the present disclosure, and FIG. 2 is a schematic structural diagram of an electronic device according to an embodiment of the present disclosure. The electronic device includes a camera 10, a main body portion (not shown in the figure), a connecting rod 103, and a driving apparatus 104; a rear face of the camera 10 is provided with a first arc-shaped surface 101 that protrudes in a direction away from the camera 10, the main body portion is provided with a second arc-shaped surface 102 that matches and is slidably connected to the first arc-shaped surface 101, and the second arc-shaped surface 102 is provided with a through hole 1031, where the connecting rod 103 penetrates through the through hole 1021, and a first end of the connecting rod 103 is hinged to the first arc-shaped surface 101 of the camera 10; and the driving apparatus 104 is connected to a second end of the connecting rod 103, and is used to drive the connecting rod 103 to drive the first arc-shaped surface 101 to slide relative to the second arc-shaped surface 102, so as to drive the camera 10 to rotate during a shooting process.

In some embodiments, the driving apparatus 104 may be an electric motor, a motor, or other driving apparatus. The processor of the electronic device is connected to the driving apparatus 104 to control the driving apparatus 104 to drive the connecting rod 103 to move along a specific trajectory, and to synthesize photos taken during the movement into a wide-angle photo based on the moving trajectory.

In addition, the first arc-shaped surface 101 may be formed by a first connector that is fixedly connected to the rear face of the camera 10 and has a first arc-shaped surface. The second arc-shaped surface 102 may be formed by a second connector that is fixedly connected to the main body of the electronic device and has a second arc-shaped surface. For example, the second arc-shaped surface 102 is fixed to the casing or the circuit board of the electronic device.

In this way, the camera 10 may be movably installed on the electronic device through the first connector and the second connector, and can have a plurality of shooting angles relative to the electronic device, thereby increasing the shooting angle of the camera 10 on the electronic device.

It should be noted that, in another implementation, the first arc-shaped surface 101 may also be formed by the rear face of the camera 10 protruding in a direction away from the camera 10; and the second arc-shaped surface 102 may also be formed by the main body of the electronic device sinking in the direction away from the camera 10. This may reduce the quantity of the components of the electronic device, thereby reducing the cost of the electronic device and simplifying the structure and installation steps of the electronic device.

Figure 3:
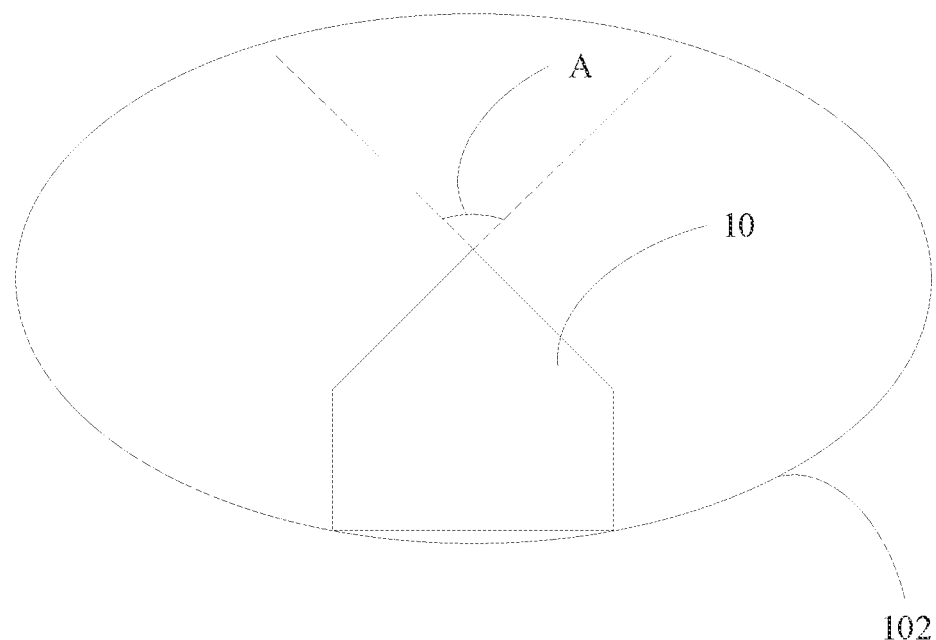
FIG. 3 is a schematic diagram of a shooting angle of a camera at an initial position.
Figure 4:
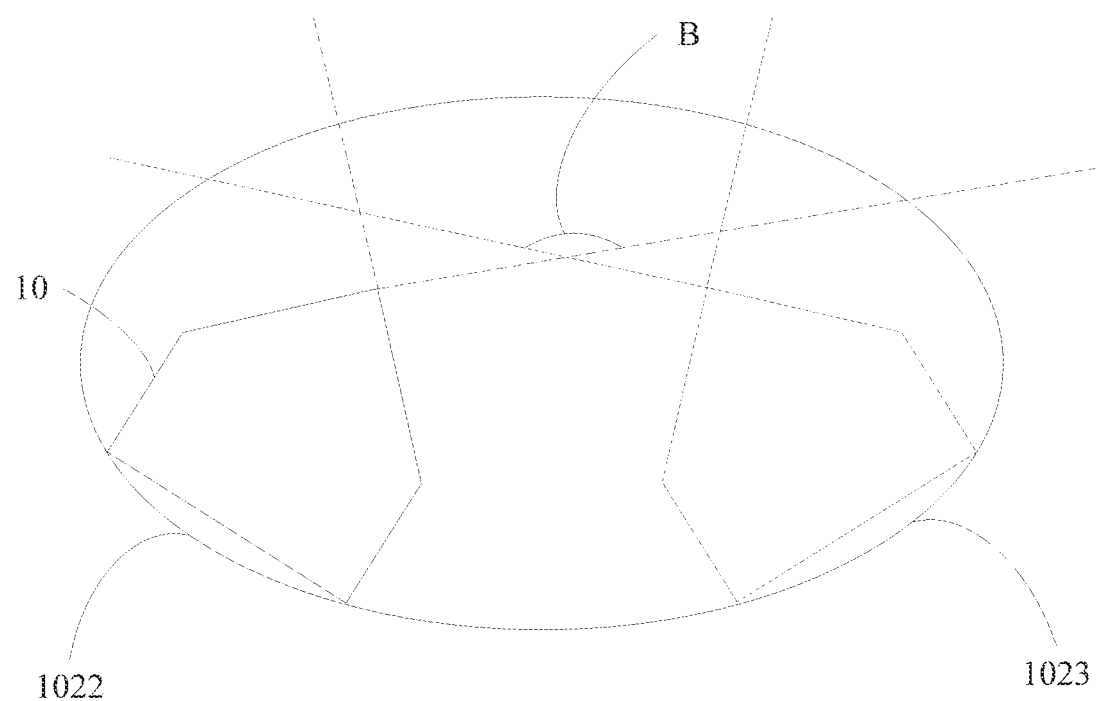
FIG. 4 is a schematic diagram of an application scenario of an electronic device according to an embodiment of the present disclosure.

In addition, the camera 10 is also electrically connected to the electronic device, so as to control the camera 10 through the input operation on the electronic device. For example, as shown in FIG. 1, the camera 10 is connected to the circuit board in the electronic device through a flexible printed circuit 20 and a connector 30. During the photographing process, namely, the process in which the electronic device receives and responds to the operation of the user, so as to take photos, the processor on the electronic device controls the driving apparatus 104 to drive the connecting rod 103 to move, so as to drive the first arc-shaped surface 101 to move relative to the second arc-shaped surface 102, thereby increasing the field of view of the camera 10, and further increasing the shooting angle of the camera 10. For example, as shown in the schematic diagrams of the shooting angle of the camera in FIG. 3 and FIG. 4, if a shooting angle A of the camera 10 is 60 degrees, in an initial position as shown in FIG. 3, the camera 10 only shoots a range of 60 degrees along its focal length axis. In a rotation process as shown in FIG. 4, if the camera 10 rotates for 60 degrees from the first end 1022 of the second arc-shaped surface 102 to the second end 1023, the focal length axis also rotates for 60 degrees from a direction of the second end 1023 to a direction of the first end 1022, so that when the shooting angle of the camera 10 covers the field of view during the movement, the angle B is 120 degrees.

It should be noted that, in the process of rotating along the second arc-shaped surface 102, the camera may capture a plurality of images that may be synthesized in the electronic device, so as to synthesize the plurality of photos captured from different angles into a wide-angle photo. The synthesis steps and algorithms are conventional techniques in the field of photography, and details are not repeated herein again.

It may be seen that, compared with the conventional shooting method in the prior art, the shooting angle of the camera is greatly increased by using the apparatus for increasing the shooting angle of the camera in this implementation.

In some embodiments, the guide rail(s) 1024 communicated with the through hole 1021 is/are disposed through the second arc-shaped surface 102, and the driving apparatus 104 drives the connecting rod 103 to move along the guide rail(s) 1024.

Figure 5:
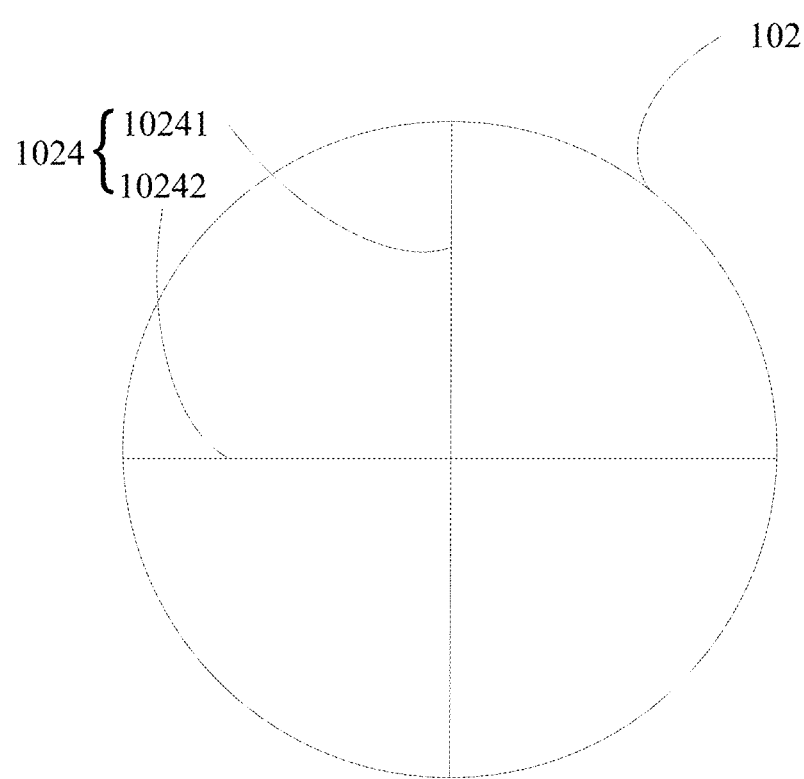
FIG. 5 is a schematic diagram of a guide rail in an electronic device according to an embodiment of the present disclosure.

There may be one or more guide rails 1024 as described above. In addition, the guide rail(s) 1024 may extend in one direction or in a plurality of directions. For example, the first guide rail 10241 and the second guide rail 10242 as shown in FIG. 5, and in some embodiments, the first guide rail 10241 extends horizontally along the electronic device, and the second guide rail 10242 extends longitudinally along the electronic device, so that the shooting angle along the horizontal and longitudinal directions of the electronic device may be increased more easily.

In some embodiments, shooting a relatively wide scenario, the camera 10 may be controlled to move on the first guide rail 10241 extending horizontally along the electronic device, so as to increase the horizontal shooting angle of the camera 10. In a case of shooting a relatively high scenario, the camera 10 may be controlled to move on the second guide rail 10242 extending longitudinally along the electronic device, so as to increase the longitudinal shooting angle of the camera 10.

In this way, the applicability of the electronic device in various shooting scenarios may be improved.

Figures 6, 7:
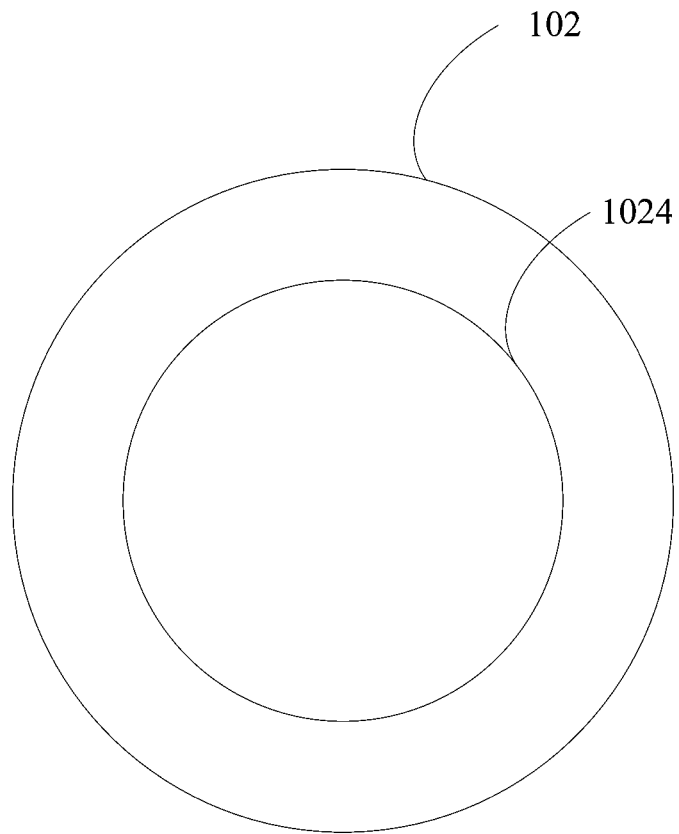
FIG. 6 is a schematic diagram of another guide rail in an electronic device according to an embodiment of the present disclosure.
FIG. 7 is a flowchart of a shooting method according to an embodiment of the present disclosure.

In some embodiments, the guide rail(s) 1024 may also be in a shape of an arc, for example, the arc guide rail(s) 1024 shown in FIG. 6. In some embodiments, the camera 10 rotates along the arc guide rail(s) 1024 relative to the main body of the electronic device, so that shooting angles of the camera 10 at every angle may be increased. It should be noted that, in this implementation, the through hole 1021 may be any point on the arc guide rail(s) 1024.

In some embodiments, a through hole may also be opened at the center of the second arc-shaped surface 102, and a communication guide rail is opened on the second arc-shaped surface 102 to communicate the through hole and the arc guide rail(s) 1024, which is not limited herein.

Further, a plane formed by the arc guide rail(s) 1024 is parallel to the rear face of the camera 10.

In this way, all increased shooting angles of the camera in all directions may be the same, and the increased shooting angles of the camera in all directions are prevented from being different, which increases the difficulty of synthesizing photos, or causes disadvantages such as the synthesized picture to be deformed, thereby optimizing the shooting performance of the camera.

It should be noted that, in some embodiments, the guide rail(s) 1024 may not be provided, but a hollow region (not shown in the figure) is formed in the center of the second arc-shaped surface 102, so that the second arc-shaped surface 102 is in an annular shape. In addition, the connecting rod 103 passes through the hollow region, and connects to the first arc-shaped surface 1 and the driving apparatus 104. Driven by the driving apparatus 104, the connecting rod 103 may swing in any direction in the hollow region, for example, swinging left and right, swinging up and down, swinging along an arc, and the like, which are not limited herein.

In this way, the shooting angle of the camera in any direction may be increased, and the shooting performance of the electronic device may be improved.

In some embodiments, the second arc-shaped surface covers only a first region of the first arc-shaped surface, where the first region is a region close to a center of the first arc-shaped surface.

During the shooting process, there may be a relative movement between the first arc-shaped surface 101, on which the camera 10 is fixed, and the second arc-shaped surface 102, an edge of the camera 10 may extend to the outside of the first arc-shaped surface 101, and the second arc-shaped surface may cover only the first region close to the center of the first arc-shaped surface.

In this way, it is possible to prevent the edge of the second arc-shaped surface from contacting the camera, which hinders the rotation of the second arc-shaped surface, so that the first arc-shaped surface and the second arc-shaped surface in the electronic device can be matched with cameras of various sizes and structures, thereby improving the applicability of the electronic device provided in the embodiments of the present disclosure.

In some embodiments, areas of the first arc-shaped surface 101 and the second arc-shaped surface 102 may further be increased, so that the camera 10 is fixed on a lower concave surface of the first arc-shaped surface 101.

In this way, it is also possible to prevent the edge of the second arc-shaped surface from contacting the camera, which hinders the rotation of the second arc-shaped surface, thereby improving the applicability of the electronic device provided in the embodiments of the present disclosure.

In some embodiments, the first arc-shaped surface 101 may be made of the conductive material.

In some embodiments, the first arc-shaped surface 101 may also be made of a non-conductive material, which may be determined based on the grounding design of the electronic device, and is not limited herein.

The electronic device provided in the embodiments of the present disclosure includes a camera and a main body portion, where a rear face of the camera is provided with a first arc-shaped surface that protrudes in a direction away from the camera, the main body portion is provided with a second arc-shaped surface that matches and is slidably connected to the first arc-shaped surface, and the second arc-shaped surface is provided with a through hole; the electronic device further includes a connecting rod, the connecting rod penetrates through the through hole, and a first end of the connecting rod is hinged to the first arc-shaped surface of the camera; and a driving apparatus, the driving apparatus is connected to a second end of the connecting rod, and is used to drive the connecting rod to drive the first arc-shaped surface to slide relative to the second arc-shaped surface, so as to drive the camera to rotate during a shooting process. In this way, the driving apparatus may drive the connecting rod to move, to drive the first arc-shaped surface to move relative to the second arc-shaped surface, so as to change the shooting angle of the camera fixed on the first arc-shaped surface, and increase the shooting angle of the camera. In addition, the electronic device has a simple structure and low production cost.

FIG. 7 is a flowchart of a shooting method according to an embodiment of the present disclosure. The method is applied to an electronic device, where the electronic device includes a main body portion and a camera, a rear face of the camera is provided with a first arc-shaped surface that protrudes in a direction away from the camera, and the main body portion is provided with a second arc-shaped surface that matches and is slidably connected to the first arc-shaped surface. As shown in FIG. 7, the method includes the following steps.

Step 701, Drive, in a case that the camera is started, the first arc-shaped surface to slide relative to the second arc-shaped surface, so as to drive the camera to rotate along a preset trajectory and capture images.

In some embodiments, the foregoing preset trajectory may be a trajectory of the guide rail(s) on the second arc-shaped surface, or may be a trajectory pre-stored in the electronic device, which is not limited herein.

Step 702, Display a target image, where the target image is obtained by synthesizing images captured by the camera.

The target image is a synthesized wide-angle photo.

In some embodiments, the image information collected by the camera may be synthesized based on the preset trajectory to obtain target image information, and the target image is an image corresponding to the target image information.

In some embodiments, the image information captured in different moving trajectories may be corresponding to different synthesis parameters, such that the target image information corresponding to the moving trajectories may be obtained.

In addition, in the process of driving the connecting rod to drive the camera fixed on the first arc-shaped surface to rotate along the preset trajectory, the camera collects images at different positions on the preset trajectory. For example, in a case that the preset trajectory extends in a same direction, an image may be collected at an initial end of the preset trajectory, and another image may be collected at the end of the preset trajectory. Finally, these two images are synthesized into a wide-angle photo.

In addition, for the process of synthesizing the images, reference may be made to the synthesizing process of panoramic shooting in the prior art, and details are not described herein. Compared with the image before synthesis, the target image information covers a wider field of view, which can improve the performance of photography.

In some embodiments, before the driving, in a case that the camera is started, the first arc-shaped surface to slide relative to the second arc-shaped surface, so as to drive the camera to rotate along a preset trajectory and capture images, the method further includes:
receiving a first control instruction for enabling a wide-angle shooting mode; and
steps of the driving, in a case that the camera is started, the first arc-shaped surface to slide relative to the second arc-shaped surface, so as to drive the camera to rotate along a preset trajectory and capture images include:
starting, in response to the first control instruction, the camera, and driving the first arc-shaped surface to slide relative to the second arc-shaped surface, so as to drive the camera to rotate along the preset trajectory and capture images.

The receiving a first control instruction for enabling a wide-angle shooting mode may be receiving an operation that the user selects to enable the wide-angle shooting mode on the electronic device, or receiving a control instruction for enabling the wide-angle shooting mode sent by other devices other than the processor or the electronic device.

In some embodiments, in a case that the wide-angle shooting mode is not enabled, the camera may perform shooting at the initial position, and a focal length direction of the camera in the initial position is perpendicular to the panel of the electronic device.

In this way, only in a case that the wide-angle shooting mode is enabled, the connecting rod may be driven to drive the camera fixed on the first arc-shaped surface to rotate along the preset trajectory, and in a case that the wide-angle shooting mode is not enabled, the camera may perform shooting at the initial position. This avoids the wide-angle shooting in unnecessary scenario and the increase of unnecessary computing resources and storage resources in the electronic device. Therefore, this implementation may be used to reduce the resource waste of the photographing method.

In some embodiments, after the driving, in a case that the camera is started, the first arc-shaped surface to slide relative to the second arc-shaped surface, so as to drive the camera to rotate along a preset trajectory and capture images, the method further includes:
driving the first arc-shaped surface to slide relative to the second arc-shaped surface, so as to drive the camera to move to an initial position, where the camera in the initial position faces a direction perpendicular to a panel of the electronic device.

That the camera faces a direction perpendicular to a panel of the electronic device described above may be understood as: the focal length direction of the camera is perpendicular to the panel of the electronic device.

In some embodiments, after the wide-angle shooting is finished, the camera may be returned to the initial position to prepare for the next shooting.

In some embodiments, before the driving, in a case that the camera is started, the first arc-shaped surface to slide relative to the second arc-shaped surface, so as to drive the camera to rotate along a preset trajectory and capture images, the method further includes:
driving the first arc-shaped surface to slide relative to the second arc-shaped surface, so as to drive the camera to slide to one end of the preset trajectory; and
the driving, in a case that the camera is started, the first arc-shaped surface to slide relative to the second arc-shaped surface, so as to drive the camera to rotate along a preset trajectory and capture images includes:
driving, in a case that the camera is started, the first arc-shaped surface to slide relative to the second arc-shaped surface, so as to drive the camera to rotate along the preset trajectory and capture images, until the camera reaches the other end of the preset trajectory.

In some embodiments, in the process of shooting a same wide-angle image, the camera is turned to rotate in a same direction, so that a plurality of graphics obtained during the wide-angle shooting process of the camera are corresponding to the spatial order. In this way, in the process of synthesizing the plurality of images into a wide-angle image, the calculation difficulty of the synthesis is reduced, especially when there are moving objects in the shooting picture. This may reduce the cases that there is same moving object in photos taken at different times, and make it easier to synthesize the wide-angle photo.

In some embodiments, the preset trajectory further includes at least one of the following:
a first trajectory located on the second arc-shaped surface and parallel to a short side of the electronic device;
a second trajectory located on the second arc-shaped surface and parallel to a long side of the electronic device; and
a third trajectory located on the second arc-shaped surface and in a shape of a circular ring.

The foregoing first trajectory, second trajectory, and third trajectory are respectively corresponding to guide rails shown in FIG. 5 and FIG. 6 with same beneficial effects. Details are not described herein again.

According to the photographing method provided in the embodiments of the present disclosure, the apparatus on the electronic device can be controlled to increase the shooting angle of the camera, so as to take photos for the preset trajectory, and synthesize the photos into a wide-angle photo, so that the camera can have a wide-angle shooting function. The method has same beneficial effects as the apparatus used to increase the shooting angle of the camera provided in the embodiments of the present disclosure, and details are not repeated herein again.

Figure 8:
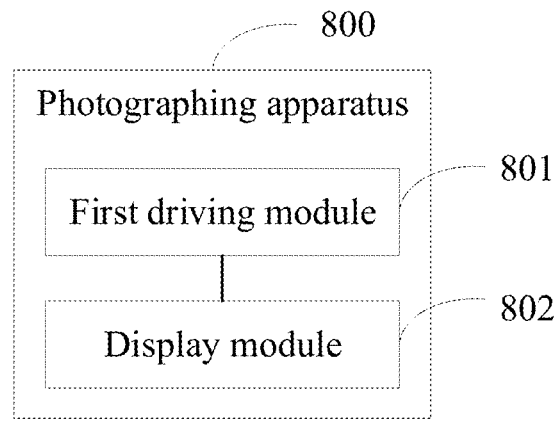
FIG. 8 is a first block diagram of a shooting apparatus according to an embodiment of the present disclosure.

Referring to FIG. 8, the embodiments of the present disclosure further provide a photographing apparatus 800, applied to an electronic device, where the electronic device includes a main body portion and a camera, a rear face of the camera is provided with a first arc-shaped surface that protrudes in a direction away from the camera, and the main body portion is provided with a second arc-shaped surface that is slidably connected to the first arc-shaped surface. As shown in FIG. 8, the apparatus 800 includes:

a first driver module 801, configured to: drive, in a case that the camera is started, the first arc-shaped surface to slide relative to the second arc-shaped surface, so as to drive the camera to rotate along a preset trajectory and capture images; and a display module 802, configured to display a target image, where the target image is obtained by synthesizing images captured by the camera.

Figure 9:
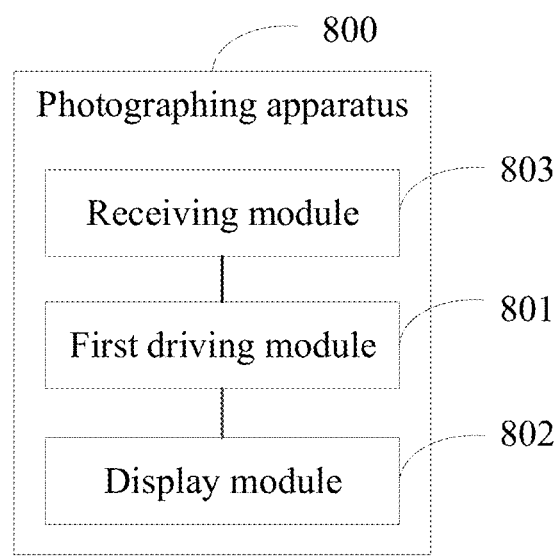
FIG. 9 is a second block diagram of a shooting apparatus according to an embodiment of the present disclosure.

In some embodiments, as shown in FIG. 9, the apparatus 800 further includes:

a receiving module 803, configured to receive a first control instruction for enabling a wide-angle shooting mode, where the first driver module 801 is configured to:

start, in response to the first control instruction, the camera, and driving the first arc-shaped surface to slide relative to the second arc-shaped surface, so as to drive the camera to rotate along the preset trajectory and capture images.

Figure 10:
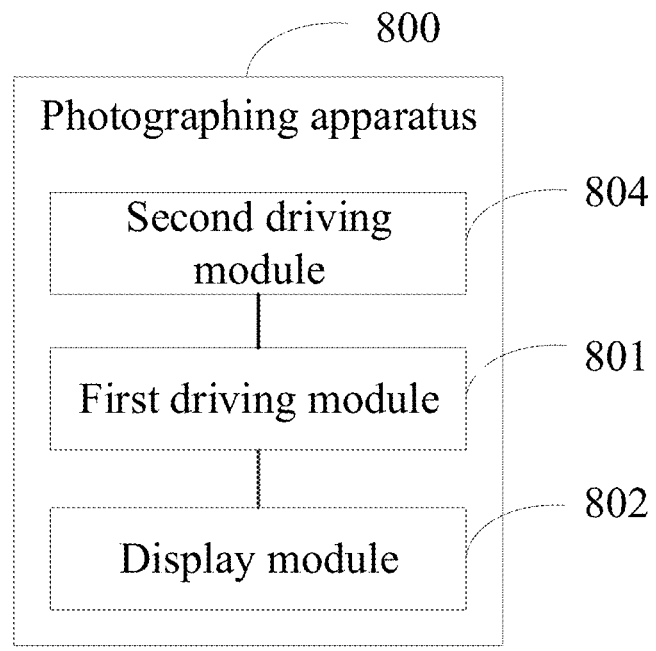
FIG. 10 is a third block diagram of a shooting apparatus according to an embodiment of the present disclosure.

In some embodiments, as shown in FIG. 10, the apparatus 800 further includes:

a second driver module 804, configured to drive the first arc-shaped surface to slide relative to the second arc-shaped surface, so as to drive the camera to move to an initial position, where the camera in the initial position faces a direction perpendicular to a panel of the electronic device.

Figure 11:
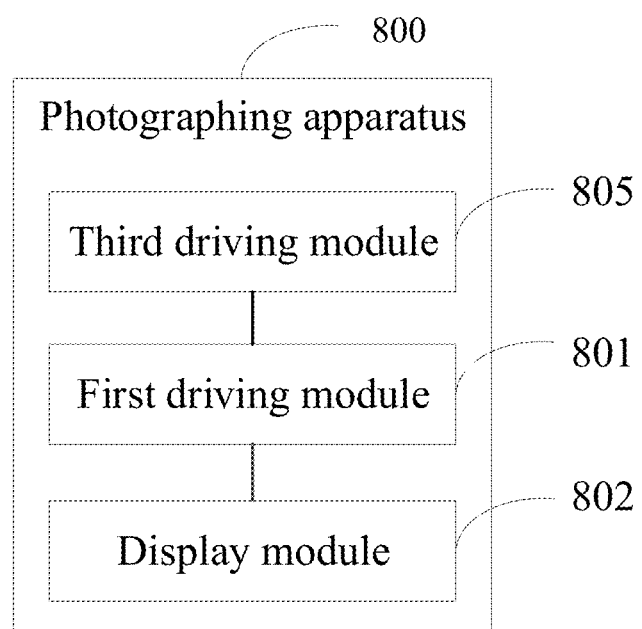
FIG. 11 is a fourth block diagram of a shooting apparatus according to an embodiment of the present disclosure.

In some embodiments, as shown in FIG. 11, the apparatus 800 further includes:

a third driver module 805, configured to drive the first arc-shaped surface to slide relative to the second arc-shaped surface, so as to drive the camera to slide to one end of the preset trajectory; and a first driver module 801, configured to: drive, in a case that the camera is started, the first arc-shaped surface to slide relative to the second arc-shaped surface, so as to drive the camera to rotate along the preset trajectory and capture images, until the camera reaches the other end of the preset trajectory.

In some embodiments, the preset trajectory further includes at least one of the following:

a first trajectory located on the second arc-shaped surface and parallel to a short side of the electronic device;

a second trajectory located on the second arc-shaped surface and parallel to a long side of the electronic device; and a third trajectory located on the second arc-shaped surface and in a shape of a circular ring.

The photographing apparatus provided in the embodiments of the present disclosure can perform each process of the photographing method provided in the embodiments of the present disclosure, and can achieve same beneficial effects. To avoid repetition, details are not repeated herein again.

Figure 12:
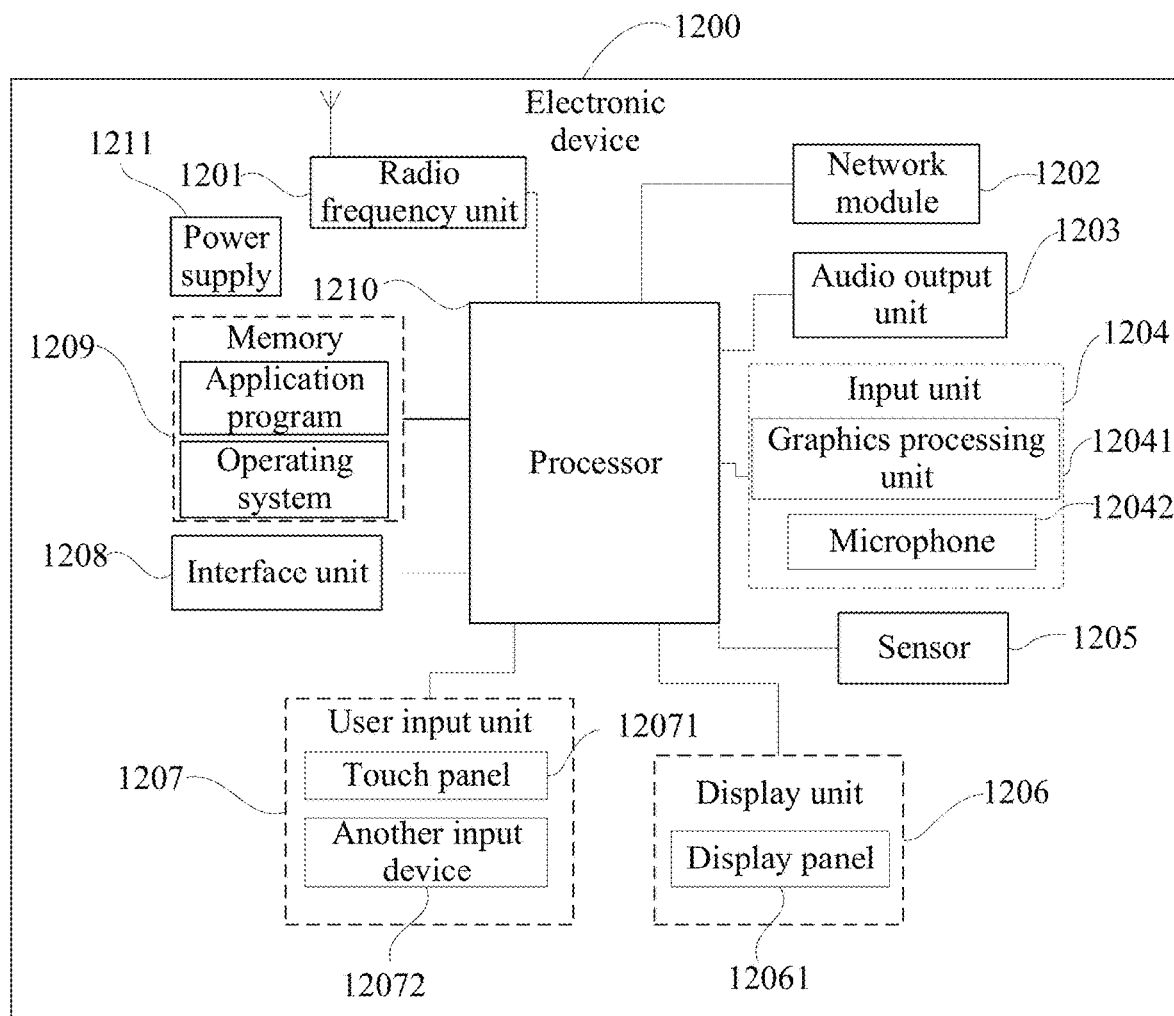
FIG. 12 is a block diagram of an electronic device according to an embodiment of the present disclosure.

FIG. 12 is a schematic structural diagram of hardware of an electronic device according to the embodiments of the present disclosure.

The electronic device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that a structure of the electronic device shown in FIG. 12 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, a computer, and the like.

The processor 1210 is configured to: drive, in a case that the camera is started, the first arc-shaped surface to slide relative to the second arc-shaped surface, so as to drive the camera to rotate along a preset trajectory and capture images; and the display unit 1206 is configured to display a target image, where the target image is obtained by synthesizing images captured by the camera.

In some embodiments, the user input unit 1207 is configured to receive a first control instruction for enabling a wide-angle shooting mode, where the processor 1210 is further configured to start, in response to the first control instruction, the camera, and drive the first arc-shaped surface to slide relative to the second arc-shaped surface, so as to drive the camera to rotate along the preset trajectory and capture images.

In some embodiments, the processor 1210 is further configured to drive the first arc-shaped surface to slide relative to the second arc-shaped surface, so as to drive the camera to move to an initial position, where the camera in the initial position faces a direction perpendicular to a display panel of the electronic device.

In some embodiments, the preset trajectory further includes at least one of the following:

a first trajectory located on the second arc-shaped surface and parallel to a short side of the electronic device;

a second trajectory located on the second arc-shaped surface and parallel to a long side of the electronic device; and a third trajectory located on the second arc-shaped surface and in a shape of a circular ring.

The electronic device 1200 provided in the embodiments of the present disclosure may control the camera installed on it to rotate during the shooting process, so as to take photos for the preset trajectory, and synthesize them into a wide-angle photo, so that the camera can have a wide-angle shooting function. The electronic device has same beneficial effects as the electronic device provided in any of the embodiments from FIG. 1 to FIG. 6, and details are not repeated herein again.

It should be understood that, in this embodiment of the present disclosure, the radio frequency unit 1201 may be configured to receive and send information or receive and send a signal in a call process. In some embodiments, after downlink data from a base station is received, the processor 1210 processes the downlink data. In addition, uplink data is sent to the base station. Usually, the radio frequency unit 1201 includes but is not limited to an antenna, at least one amplifier, a transceiver, a coupler, a low noise amplifier, a duplexer, and the like. In addition, the radio frequency unit 1201 may communicate with a network and another device through a wireless communication system.

The electronic device provides wireless broadband Internet access for the user by using the network module 1202, for example, helping the user to send and receive an e-mail, brows a web page, and access streaming media.

The audio output unit 1203 may convert audio data received by the radio frequency unit 1201 or the network module 1202 or stored in the memory 1209 into an audio signal and output the audio signal as a sound. In addition, the audio output unit 1203 may further provide an audio output (for example, a call signal received voice, or a message received voice) related to a function implemented by the electronic device 1200. The audio output unit 1203 includes a speaker, a buzzer, a telephone receiver, and the like.

The input unit 1204 is configured to receive an audio signal or a video signal. The input unit 1204 may include a Graphics Processing Unit (GPU) 12041 and a microphone 12042. The graphics processing unit 12041 processes image data of a static picture or a video obtained by an image capture apparatus (such as a camera) in a video capture mode or an image capture mode. A processed image frame may be displayed on the display unit 1206. The image frame processed by the graphics processing unit 12041 may be stored in the memory 1209 (or another storage medium) or sent by using the radio frequency unit 1201 or the network module 1202. The microphone 12042 may receive a sound and can process such sound into audio data. Processed audio data may be converted, in a call mode, into a format that can be sent to a mobile communication base station by using the radio frequency unit 1201 for output.

The electronic device 1200 further includes at least one sensor 1205, for example, a light sensor, a motion sensor, and another sensor. In some embodiments, the light sensor includes an ambient light sensor and a proximity sensor. The ambient light sensor may adjust luminance of the display panel 12061 based on brightness of ambient light. The proximity sensor may turn off the display panel 12061 and/or backlight when the electronic device 1200 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 1205 may further include a fingerprint sensor, a pressure sensor, an iris sensor, a molecular sensor, a gyroscope, a barometer, a hygrometer, a thermometer, an infrared sensor, and the like. Details are not described herein.

The display unit 1206 is configured to display information input by a user or information provided for a user. The display unit 1206 may include a display panel 12061. The display panel 12061 may be configured in a form of a Liquid Crystal Display (LCD), an Organic Light-Emitting Diode (OLED), or the like.

The user input unit 1207 may be configured to: receive input digital or character information, and generate key signal input related to a user setting and function control of the electronic device. In some embodiments, the user input unit 1207 includes a touch panel 12071 and another input device 12072. The touch panel 12071 is also referred to as a touchscreen, and may collect a touch operation of the user on or near the touch panel (for example, an operation performed on or near the touch panel 12071 by the user by using any appropriate object or accessory such as a finger or a stylus). The touch panel 12071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1210, and receives and executes a command sent by the processor 1210. In addition, the touch panel 12071 may be implemented by using a plurality of types such as a resistive type, a capacitive type, an infrared ray, and a surface acoustic wave. The user input unit 1207 may include other input devices 12072 in addition to the touch panel 12071. In some embodiments, the another input device 12072 may include but is not limited to: a physical keyboard, a function button (such as a volume control button, a switch button), a trackball, a mouse, and a joystick, which is not described herein.

Further, the touch panel 12071 may cover the display panel 12061. When detecting the touch operation on or near the touch panel 12071, the touch panel 12071 transmits the touch operation to the processor 1210 to determine a type of a touch event, and then the processor 1210 provides corresponding visual output on the display panel 12061 based on the type of the touch event. Although in FIG. 12, the touch panel 12071 and the display panel 12061 are configured as two independent components to implement input and output functions of the electronic device, in some embodiments, the touch panel 12071 and the display panel 12061 can be integrated to implement the input and output functions of the electronic device. Details are not limited herein.

The interface unit 1208 is an interface for connecting an external apparatus with the electronic device 1200. For example, the external apparatus may include a wired or wireless headset port, an external power supply (or a battery charger) port, a wired or wireless data port, a storage card port, a port configured to connect to an apparatus having an identification module, an audio Input/Output (I/O) port, a video I/O port, a headset port, and the like. The interface unit 1208 may be configured to receive input (for example, data information and power) from an external apparatus and transmit the received input to one or more elements in the electronic device 1200 or may be configured to transmit data between the electronic device 1200 and an external apparatus.

The memory 1209 may be configured to store a software program and various data. The memory 1209 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1209 may include a high-speed random access memory, and may further include a nonvolatile memory, for example, at least one magnetic disk storage device, a flash storage device, or another volatile solid-state storage device.

The processor 1210 is a control center of the electronic device, connects all parts of the entire electronic device by using various interfaces and lines, and performs various functions of the electronic device and data processing by running or executing a software program and/or a module that are/is stored in the memory 1209 and by invoking data stored in the memory 1209, to overall monitor the electronic device. The processor 1210 may include one or more processing units. Preferentially, the processor 1210 may be integrated with an application processor and a modem processor. The application processor mainly processes an operating system, a user interface, an application program, and the like, and the modem processor mainly processes wireless communication. It can be understood that, in some embodiments, the modem processor may not be integrated into the processor 1210.

The electronic device 1200 may further include the power supply 1210 (such as a battery) supplying power to each component. Preferably, the power supply 1210 may be logically connected to the processor 1210 by using a power management system, so as to implement functions such as charging management, discharging management and power consumption management by using the power management system.

In addition, the electronic device 1200 includes some function modules not shown, and details are not described herein.

The embodiments of the present disclosure further provide an electronic device, including a processor 1210, a memory 1209, and a computer program that stored in the memory 1209 and capable of running on the processor 1210. When the computer program is executed by the processor 1210, the foregoing processes of the photographing method embodiment are implemented, and a same technical effect can be achieved. To avoid repetition, details are not described herein again.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing implementations. The foregoing implementations are merely examples, but are not limiting. A person of ordinary skill in the art may make many forms without departing from the objective and the scope of the claims of the present disclosure, and these forms all fall within the protection scope of the present disclosure.

The invention claimed is:

1. An electronic device, comprising:
    a camera enabled for a wide-angle shooting mode, wherein a rear face of the camera is provided with a first arc-shaped surface that protrudes in a direction away from the camera;
    a main body portion, wherein the main body portion is provided with a second arc-shaped surface that matches and is slidably connected to the first arc-shaped surface;
    a connecting rod;
    two guide rails; and
    a driving apparatus, configured to drive the first arc-shaped surface to slide relative to the second arc-shaped surface, causing the camera to rotate for implementing the wide-angle shooting mode, wherein the connecting rod is between the camera and the driving apparatus, the two guide rails each extend in a fixed linear direction, and the driving apparatus is configured to drive the connecting rod to move along each of the two guide rails.

2. The electronic device according to claim 1, wherein the second arc-shaped surface is provided with a through hole, the connecting rod penetrates through the through hole, a first end of the connecting rod is hinged to the first arc-shaped surface of the camera, the driving apparatus is connected to a second end of the connecting rod.

3. The electronic device according to claim 2, wherein the two guide rails communicate with the through hole and are both disposed through the second arc-shaped surface.

4. The electronic device according to claim 1, wherein the two guide rails comprise: a first guide rail and a second guide rail, wherein the first guide rail extends horizontally along the electronic device, and the second guide rail extends longitudinally along the electronic device.

5. The electronic device according to claim 1, wherein the two guide rails are arc-shaped.

6. The electronic device according to claim 1, wherein the second arc-shaped surface covers a first region of the first arc-shaped surface, wherein the first region is a region close to a center of the first arc-shaped surface.

7. The electronic device according to claim 2, wherein the through hole is at the center of the second arc-shaped surface.

* * * * *